United States Patent Office 3,489,838
Patented Jan. 13, 1970

3,489,838
REPELLING BIRDS
Lyle D. Goodhue and Kenneth E. Cantrel, Bartlesville, Okla., assignors to Phillips Petroleum Company, a corporation of Delaware
No Drawing. Filed Oct. 19, 1967, Ser. No. 676,616
Int. Cl. A01n 9/22
U.S. Cl. 424—263
6 Claims

ABSTRACT OF THE DISCLOSURE

A method for repelling birds comprises applying to the desired locus a bird repellent composition comprising a heterocyclic nitrogen-containing compound having a structural formula selected from

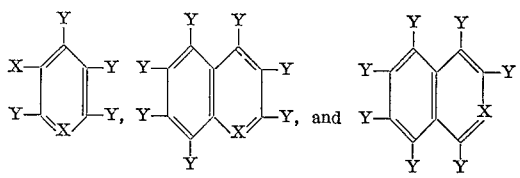

where X is selected from the group consisting of —N= and

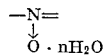

$n$ is an integer selected from the group consisting of 0, 1 and 2; each Y is selected from the group consisting of nitro, R, and

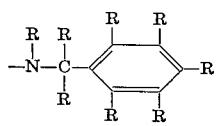

one and only one Y being

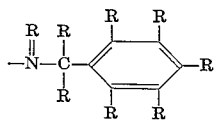

and not more than one Y being nitro; and each R is selected from the group consisting of hydrogen, methyl and ethyl radicals. The compositions can be applied in conjunction with an adhesive base.

BACKGROUND OF THE INVENTION

The prior art is replete with devices intended to prevent birds from landing or roosting within a particular locale. A few of the devices which have been used for this purpose include scarecrows, noisemakers, and the like. Since a device of this type takes advantage of the inherent wariness of birds, it frequently happens that the birds become so accustomed to the devices that it is no longer effective for the intended purpose. More elaborate devices have been used for preventing birds from resting on the ledges and window sills of large buildings in metropolitan areas. One such device includes a plurality of electrical conductors attached to insulated posts or the like positioned on the ledges and window sills of a building. Birds are discouraged from resting on the ledges by passing electric current through the conductors. Although a device of this type is reasonably effective, it is expensive and extremely difficult to install.

Accordingly, it is an object of this invention to provide a novel bird repellent composition.

Another object of this invention is to provide an effective method of rendering a locus repellent to birds.

Still another object of this invention is to provide a simple and efficient method of preventing birds from resting on a surface.

SUMMARY

In accordance with this invention, birds are discouraged from resting on a particular surface by applying to said surface a heterocyclic nitrogen-containing compound having a structural formula selected from

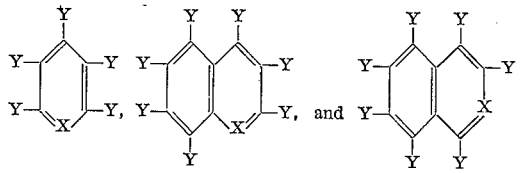

where X is selected from the group consisting of —N= and

$n$ is an integer selected from the group consisting of 0, 1 and 2; each Y is selected from the group consisting of nitro, R, and

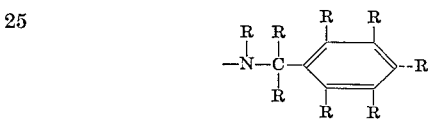

one and only one Y being

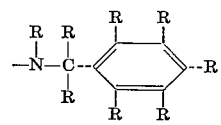

and not more than one Y being nitro; and each R is selected from the group consisting of hydrogen and methyl and ethyl radicals; and wherein the total number of carbon atoms in said heterocyclic nitrogen-containing compound preferably is not more than about 20.

Examples of some heterocyclic nitrogen-containing compounds which can be used as bird repellents in the process of this invention include:

2-benzylaminopyridine
2-benzylamino-5-nitropyridine
3-(α-methylbenzylamino)pyridine
4-(N-methylbenzylamino)pyridine
2-(p-ethylbenzylamino)-3-methylpyridine
3-benzylamino-2,5-diethylpyridine
4-benzylamino-2-ethyl-3-methyl-6-nitropyridine
2-benzylamino-3,4,5,6-tetraethylpyridine 1-oxide dihydrate
3-benzylamino-2-methyl-4-nitropyridine 1-oxide
2-benzylaminoquinoline
3-(m-methylbenzylamino)-6-nitroquinoline
4-(α-ethylbenzylamino)-2,3-dimethylquinoline
5-benzylamino-4,7-dimethyl-2-nitroquinoline
6-benzylamino-5-methyl-8-ethylquinoline 1-oxide
7-benzylamino-8-methyl-3-nitroquinoline 1-oxide monohydrate
8-benzylamino-6-nitroquinoline
1-benzylaminoisoquinoline
3-(o-ethylbenzylamino)-5-nitroisoquinoline
4-(α-methylbenzylamino)-1-methyl-8-ethylisoquinoline 2-oxide dihydrate
5-(N-methylbenzylamino)-3-methyl-7-nitroisoquinoline
6-benzylamino-4-ethyl-1-nitroisoquinoline
7-benzylamino-5-methyl-3-nitroisoquinoline 2-oxide
8-benzylamino-6-methylisoquinoline
and the like.

DESCRIPTION OF THE PREFERRED EMBODIMENTS

The bird repellent compounds of this invention can be applied to a surface for their intended purpose as the pure compound, either as free bases or acid salts, or in solution in an inert solvent. Suitable inert solvents which can be used in the practice of this invention includes acetone, kerosene, naphthas, and isoparaffinic hydrocarbons which boil in the range of from about 260° F. to 800° F. The bird repellent compounds can also be applied to a surface in admixture with water in the form of an aqueous emulsion in which case a suitable emulsifying or wetting agent is employed. In certain instances it may be desirable to apply the compounds as a dust or a powder. The compounds can be dispersed in a solid carrier such as kieselguhr and the like when applied in this manner. A suitable adhesive can be admixed with the liquid or solid carrier such that the bird repellent compound will remain on the surface to which it is applied over extended periods of time. The use of an adhesive is generally preferred when the bird repellent is applied to exposed ledges and window sills of buildings because it will be less affected by the action of rain and wind. Examples of materials which can be used as carriers and which also function as an adhesive are rubber latices including those of the natural and synthetic type, such as latices of polymers of butadiene, isoprene and copolymers with vinyl aromatic compounds such as styrene; gelatins; substituted cellulose such as methyl cellulose; low molecular weight polymers such as polyisobutylene; and petrolatum. Latices of polymers, e.g., of rubbery polymers, are particularly suitable as carriers and adhesives because of the high degree of repellency obtained when they are admixed with the bird repellent compounds of this invention. The characteristics of the polymers employed as adhesive bases should be such that the polymer, once applied, will adhere sufficiently to the point of application to retain the repellent.

The bird repellent compounds of this invention can be applied in the previously described forms by spraying, brushing, dusting, and the like. It is generally preferred to apply tthe compounds by spraying them onto a surface with a liquid solvent as a carrier. It was found that an extremely uniform application can be achieved by applying the compounds in this manner. When the bird repellent compounds are dissolved in one of the solvents described above, the mixture will contain from about 0.1 to 60 weight percent of the compound. When the compound is dispersed in a solid carrier, it is present in an amount within the range of from about 1 to about 60 weight percent based upon the total weight of the mixture. Although these ranges have been given to be effective for repelling birds when applied to a surface, it is to be understood that concentrations above and below these ranges can be used.

The compounds of this invention are effective to repel birds from a surface when present on the surface in an amount within the range of from about 0.01 to 25 grams per square foot of surface area. Although larger amounts of the bird repellent compounds can be used without departing from the spirit and scope of the invention, for obvious economic reasons it is generally preferred not to exceed about 25 grams per square foot of surface area.

A series of demonstrations of the effectiveness of the bird repellent compositions of this invention were made on several species of birds in several environments. The following examples illustrate the results of these demonstrations and the effectiveness of the inventive method and the compositions as bird repellents. It is to be understood that these examples are for the purpose of illustrating the invention and are in no way intended to limit the application thereof.

It should also be observed that a considerable advantage of the methods and compositions of this invention derives from the fact that birds are repelled from the desired locus without the requirement that they ingest any part of the repellent compositions. It is well known that many species of birds roost in one location and feed in yet another. Therefore, if it were necessary that the inventive compositions be ingested to accomplish the desired repellency, little effectiveness would be realized in roosting areas where the birds do not feed. However, due to the fact that the effectiveness of the methods and compositions herein involved does not require the ingestion of anything whatever, it can be seen that the exclusion of birds from any area whatever can be achieved. These advantages are illustrated in the following examples.

EXAMPLE I 2-benzylaminopyridine was tested as a roost repellent for starlings. A wire screen cage having vertical sides was provided with two horizontal roosting bars, each of which was about 36 inches long with an upper surface ¾ inch wide. The bottom of the cage was immersed in a vessel containing water so that the roosting bars afforded the only horizontal resting surface. Four starlings were released in the cage, and after they had become accustomed to their surroundings, it was observed that the starlings spent about equal time on each of the roosting bars. To the upper surface of one of the roosting bars was then applied 1 g. of 2-benzylaminopyridine.

After one hour, the number of starlings resting on each of the roosting bars was observed. Observations were made every 15 minutes thereafter until a total of five readings was obtained. Table 1 summarizes the results obtained in a series of three tests carried out in this manner.

Also shown in Table 1 are the results obtained in two similar tests in which 1 g. of 2-benzylamino-5-nitropyridine, instead of 2-benzylaminopyridine, was applied to the upper surface of one roosting bar.

TABLE 1

| Test No. | Composition Applied to One Roosting Bar | Number of Starlings on Roosting Bar at Specified Time in Minutes Following Application of Compound | | | | | |
|---|---|---|---|---|---|---|---|
| | | 60 | 75 | 90 | 105 | 120 | Total |
| 1 | 2-benzylaminopyridine | 0 | 0 | 0 | 0 | 0 | 0 |
| | Untreated roosting bar | 4 | 4 | 4 | 4 | 4 | 20 |
| 2 | 2-benzylaminopyridine | 1 | 0 | 0 | 0 | 0 | 1 |
| | Untreated roosting bar | 3 | 4 | 4 | 4 | 4 | 19 |
| 3 | 2-benzylaminopyridine | 1 | 1 | 0 | 0 | 1 | 3 |
| | Untreated roosting bar | 3 | 3 | 4 | 4 | 3 | 17 |
| 4 | 2-benzylamino-5-nitropyridine | 0 | 0 | 0 | 0 | 0 | 0 |
| | Untreated roosting bar | 4 | 4 | 4 | 4 | 4 | 20 |
| 5 | 2-benzylamino-5-nitropyridine | 1 | 2 | 3 | 1 | 1 | 8 |
| | Untreated roosting bar | 3 | 2 | 1 | 3 | 3 | 12 |

EXAMPLE II

Two starlings were released in a cage having a roosting bar about 20 inches long with an upper surface ¾ inch wide. After the starlings had become accustomed to their surroundings, it was observed that they spent approximately 95 percent of the time on the roosting bar.

One gram of 2-benzylaminopyridine was then applied to the upper surface of the roosting bar, and the activity of the starlings was observed. A roosting index defined as the ratio of the time spent by the birds on the treated roosting bar to the total elapsed time was then used to determine the effectiveness of the compound. In this manner, the roosting index was found to be 0.13 over a period of 23 hours and 41 minutes for the roosting bar having the 2-benzylaminopyridine deposited thereon.

In a similar test in which 1 g. of 2-benzylamino-5-nitropyridine, instead of 2-benzylaminopyridine, was applied to the roost, the roosting index was found to be 0.18 over a period of 42 hours and 35 minutes.

EXAMPLE III

Flicker woodpeckers had been pecking holes in redwood siding of a residence. As it is known that woodpeckers return to an area which they have damaged and enlarged the holes they have made, 100 ml. of a bird repellent solution was brushed in most of the holes. This solution comprised 9.5 g. of 2-benzylaminopyridine, 0.25 g. of rosin, and 0.25 g. of vegetable oil, the remainder of the solution being acetone. The solvent evaporated rapidly from the painted areas, leaving a residue of fine crystals in and immediately around the holes. The rosin and vegetable oil promoted adhesion of the crystals to the wood without masking the repellency of the 2-benzylaminopyridine. During the week which followed application of the formulation, a few woodpeckers returned. However, after 1 week had passed, no woodpeckers returned, and no further damage was suffered during the 5 months which followed.

EXAMPLE IV

Several species of woodpeckers were severely damaging a house, so the area around all of the resulting holes was painted with 200 ml. of a solution having the same composition as that described in Example III. Some light pecking occurred during the following week without noticeable additional damage. After that, the woodpeckers left the scene and caused no further damage during the 5 months which followed.

EXAMPLE V

An active chimney swallow nest was sprinkled with 10 g. of powdered 2-benzylaminopyridine. The cover was returned to the chimney opening, and in about 30 minutes the swallows returned and destroyed the nest and eggs. The swallows did not return during the six months which followed.

EXAMPLE VI

House sparrows nesting in a garage were acting as a nuisance. The nests were all removed, but the sparrows rebuilt them rapidly.

After three nests were rebuilt and in use, ¼ teaspoon of finely powdered 2-benzylaminopyridine was sprinkled over the inside of each nest. The birds then become disturbed and damaged the inside of the nests. Many eggs were broken. All of the sparrows abandoned the nesting area after 1 day, and none had returned after 3 weeks.

It can thus be seen that these methods and compositions are quite effective repelling birds from any desired location, whether or not it is a location frequented for feeding purposes.

We claim:

1. A method of repelling birds from a surface which comprises exposing said birds to a surface treated with an effective repelling amount of at least one benzylamino compound selected from the group consisting of

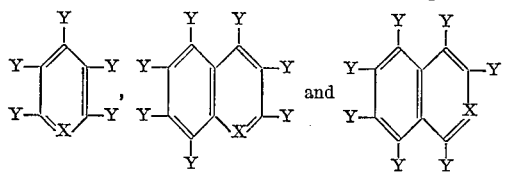

where X is selected from the group consisting of —N=
and

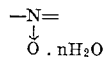

$n$ is an integer selected from the group consisting of 0, 1, and 2; each Y is selected from the group consisting of nitro, R, and

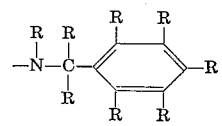

one and only one Y being

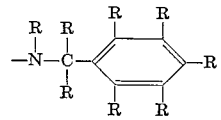

and not more than one Y being nitro; and each R is selected from the group consisting of hydrogen, methyl and ethyl.

2. The method of claim 1 wherein the total number of carbon atoms in said compound is in the range 12–20 and wherein said compound is applied in an amount to provide about 0.01 to about 25 grams of said compound per square foot of surface area.

3. The method of claim 1 wherein said compound is 2-benzylaminopyridine or 2-benzylamino-5-nitropyridine.

4. A method according to claim 1 wherein said compound is applied to the surface by means of a liquid carrier selected from the group consisting of water, acetone, kerosene, naphthas and isoparaffinic hydrocarbons which boil in the range of about 260° to about 800° F., the amount of said compound present in said liquid carrier being in the range of 0.1 to 60 weight percent of said compound based on the total weight of the mixture.

5. A method according to claim 1 wherein said compound is applied to the surface in admixture with an adhesive, the amount of said compound present in said admixture being in the range 1–60 weight percent of said compound based on the total weight of the admixture.

6. A method according to claim 1 wherein said compound is dispersed in kieselguhr prior to being applied to said surface, the amount of said compound dispersed in kieselguhr being in the range 1–60 weight percent of said compound based on the total weight of the mixture.

References Cited

UNITED STATES PATENTS

| | | | |
|---|---|---|---|
| 1,764,888 | 6/1930 | Ames | 167—42 |
| 2,966,440 | 12/1960 | Gerolt | 167—42 |
| 3,028,308 | 4/1962 | Zambito et al. | 167—82 |
| 3,030,266 | 4/1962 | Cuille et al. | 167—42 |
| 3,044,930 | 7/1962 | Goodhue et al. | 167—46 |
| 3,113,072 | 12/1963 | Goodhue et al. | 167—46 |
| 3,150,041 | 9/1964 | Goodhue et al. | 167—46 |
| 3,158,535 | 11/1964 | Beerbower et al. | 167—24 |
| 3,193,455 | 7/1965 | Reinert | 167—46 |

OTHER REFERENCES

Chemical Abstracts, vol. 52, p. 10075 (1958) and vol. 55, p. 23134 (1961).

ALBERT T. MEYERS, Primary Examiner

F. E. WADDELL, Assistant Examiner

U.S. Cl. X.R.

424—258